United States Patent
Song et al.

(10) Patent No.: US 10,965,680 B2
(45) Date of Patent: Mar. 30, 2021

(54) AUTHORITY MANAGEMENT METHOD AND DEVICE IN DISTRIBUTED ENVIRONMENT, AND SERVER

(71) Applicant: Beijing Baidu Netcom Science and Technology Co., Ltd., Beijing (CN)

(72) Inventors: Shuangyang Song, Beijing (CN); Linjiang Lian, Beijing (CN); Meng Wang, Beijing (CN); Xianhui Niu, Beijing (CN); Li Li, Beijing (CN)

(73) Assignee: BEIJING BAIDU NETCOM SCIENCE AND TECHNOLOGY CO., LTD., Beijing (CN)

(*) Notice: Subject to any disclaimer, the term of this patent is extended or adjusted under 35 U.S.C. 154(b) by 207 days.

(21) Appl. No.: 16/162,129

(22) Filed: Oct. 16, 2018

(65) Prior Publication Data

US 2019/0230086 A1 Jul. 25, 2019

(30) Foreign Application Priority Data

Jan. 23, 2018 (CN) .......................... 201810064716.6

(51) Int. Cl.
*H04L 29/06* (2006.01)
*H04L 29/08* (2006.01)
(Continued)

(52) U.S. Cl.
CPC .......... *H04L 63/101* (2013.01); *G06F 21/604* (2013.01); *G06F 21/6218* (2013.01); *G06N 20/00* (2019.01); *H04L 63/102* (2013.01); *H04L 63/1425* (2013.01); *H04L 63/1441* (2013.01); *H04L 67/22* (2013.01); *G06F 2221/2141* (2013.01); *H04L 67/1097* (2013.01)

(58) Field of Classification Search
None
See application file for complete search history.

(56) References Cited

U.S. PATENT DOCUMENTS

2002/0162017 A1* 10/2002 Sorkin ................ H04L 63/1408
726/4
2017/0111381 A1* 4/2017 Jones .................. H04L 63/1433
(Continued)

FOREIGN PATENT DOCUMENTS

CN 101141304 A 3/2008
CN 103236928 A 8/2013
(Continued)

OTHER PUBLICATIONS

Chinese Office Action dated Sep. 5, 2018, received for corresponding Chinese Application No. 201810064716.6, 5 pages.

*Primary Examiner* — Joseph P Hirl
*Assistant Examiner* — Hassan Saadoun
(74) *Attorney, Agent, or Firm* — Kinney & Lange, P.A.

(57) ABSTRACT

An authority management method and device in a distributed environment, and a server are provided. The method includes: obtaining usage information of a user when the user uses an object storage product, the usage information including the user's behavior, status and feature; determining a matching degree between the usage information of the user and usage information predicted by a portrait model of the user; and applying a preset early warning mechanism to the user's access authorities according to the matching degree.

11 Claims, 3 Drawing Sheets

(51) Int. Cl.
*G06F 21/60* (2013.01)
*G06F 21/62* (2013.01)
*G06N 5/02* (2006.01)
*G06N 20/00* (2019.01)

(56) References Cited

U.S. PATENT DOCUMENTS

2018/0293377 A1* 10/2018 Tomonaga ............ G06F 21/552
2020/0219108 A1* 7/2020 Griffin ............... G06Q 20/3227

FOREIGN PATENT DOCUMENTS

| | | |
|---|---|---|
| CN | 103581187 A | 2/2014 |
| CN | 105357201 A | 2/2016 |
| CN | 105827608 A | 8/2016 |
| CN | 106850509 A | 6/2017 |
| CN | 107579993 A | 1/2018 |

* cited by examiner

AUTHORITY MANAGEMENT METHOD AND DEVICE IN DISTRIBUTED ENVIRONMENT, AND SERVER

CROSS-REFERENCE TO RELATED APPLICATION

This application claims priority to Chinese Patent Application No. 201810064716.6, filed on Jan. 23, 2018, which is hereby incorporated by reference in its entirety.

TECHNICAL FIELD

The present disclosure relates to the field of information processing technologies, and in particular, to an authority management method and device in a distributed environment, and a server.

BACKGROUND

The rapid development of cloud computing has changed people's understanding of traditional infrastructure services, data storage, etc. As cloud computing can reduce the cost of storage and computing, cloud storage services are increasingly trusted by enterprises and individuals. However, the use of cloud storage may bring serious threats to important data, and when data are accessed by unauthorized access, the confidentiality and integrity of the data will be affected.

Currently, the authority management of cloud computing is implemented based on an Access Control List (ACL). The ACL is an access control list of a file/directory, and is used to control the packets into and out of the port. Specifically, different access authorities may be set for a given data resource, and different users may be authorized to operate according to different access authorities. The ACL includes two levels of ACL: a Bucket ACL and an Object ACL. In the bucket ACL, access authorities can be set for a resource in the bucket; and in the Object ACL, access authorities can be directly set for an object. If no access authority is set for the object, the operation is performed according to the bucket ACL.

In the traditional technology, the authority management based on the ACL is complicated, which may lead to misuse.

SUMMARY

According to embodiments of the present disclosure, an authority management method and device in a distributed environment and a server are provided, to solve or alleviate one or more technical problems mentioned in the background, and to at least provide a beneficial choice.

In a first aspect, an authority management method in a distributed environment is provided according to an embodiment of the present disclosure, the method including:

obtaining usage information of a user when the user uses an object storage product; the usage information including the user's behavior, status and feature;

determining a matching degree between the usage information of the user and usage information predicted by a portrait model of the user; and applying a preset early warning mechanism to the user's access authorities according to the matching degree.

In combination with the first aspect, in a first embodiment of the first aspect of the present disclosure, before said determining a matching degree between the usage information of the user and usage information predicted by a portrait model of the user, the method further includes:

constructing the portrait model of the user using a machine learning method according to historical usage information samples of the user about the object storage product.

In combination with the first aspect, in a second embodiment of the first aspect of the present disclosure, said applying a preset early warning mechanism to the user's access authorities according to the matching degree includes:

performing a locking operation on an access control list of the user according to the matching degree.

In combination with the second embodiment of the first aspect, the locking operation is classified into two types: an immediate locking operation and a restricted locking operation.

In combination with a first implementation of the second embodiment of the first aspect, said performing a locking operation on an access control list of the user according to the matching degree includes:

performing the immediate locking operation on the access control list of the user when the matching degree is less than a first preset threshold, to lock all the access requests to the access control list; and recording all the access requests so as to continue processing the access requests after the locking operation is released.

In combination with a second implementation of the second embodiment of the first aspect, said performing a locking operation on an access control list of the user according to the matching degree includes:

performing the restricted locking operation on the access control list of the user when the matching degree is greater than or equal to the first preset threshold and less than a second preset threshold, to restrict the access requests to the access control list.

In combination with a third implementation of the second embodiment of the first aspect, said performing a locking operation on an access control list of the user according to the matching degree includes:

verifying the identity of the user by using a preset authentication mechanism when the matching degree is greater than or equal to the second preset threshold, and releasing the locking operation in a case that the user has passed the identity verification.

In combination with a first or second or third implementation of the second embodiment of the first aspect, the first preset threshold and the second preset threshold are set according to the types of authorities in the access control list.

In combination with the first aspect, in a third embodiment of the first aspect of the present disclosure, before said obtaining usage information of a user when the user uses an object storage product, the method further includes:

monitoring a network traffic used by the user in a unit time; and performing a locking operation on an access control list of the user according to the network traffic.

In combination with the first aspect, in a fourth embodiment of the first aspect of the present disclosure, before said obtaining usage information of a user when the user uses an object storage product, the method further includes:

monitoring an object to which the user sends an access request;

directly blocking access to the object of the access request in a case that the object of the access request is in a black list; and skipping the preset early warning mechanism to normally access the object of the access request in a case that the object of the access request is in a white list.

In a second aspect, an authority management device in a distributed environment is provided according to an embodiment of the present disclosure, the device including:

an obtaining module configured to obtain usage information of a user when the user uses an object storage product, the usage information including the user's behavior, status and feature;

a determining module configured to determine a matching degree between the usage information of the user and usage information predicted by a portrait model of the user; and an early warning module configured to apply a preset early warning mechanism to the user's access authorities according to the matching degree.

In combination with the second aspect, in a first embodiment of the second aspect of the present disclosure, the device further includes:

a first monitoring module configured to monitor a network traffic used by the user in a unit time; and a locking module configured to perform a locking operation on an access control list of the user according to the network traffic.

In combination with the second aspect, in a second embodiment of the second aspect of the present disclosure, the device further includes:

a second monitoring module configured to monitor an object to which the user sends an access request, directly block access to the object of the access request in a case that the object of the access request is in a black list, and skip the preset early warning mechanism to normally access the object of the access request in a case that the object of the access request is in a white list.

In a third aspect, a server is provided according to an embodiment of the present disclosure, the server including:

one or more processors; and a storage device configured to store one or more programs, the one or more programs, when executed by the one or more processors, enable the one or more processors to implement the method described above.

In a fourth aspect, a computer readable storage medium is provided according to an embodiment of the present disclosure, for storing a computer software instruction used by a authority management device in a distributed environment and including a program involved in execution of the authority management method in a distributed environment in the above first aspect.

One or more of the above technical solutions may have the following advantages or advantageous effects: according to technical solutions of embodiments of the present disclosure, the usage information of the user is compared with usage information predicted by a portrait model of the user, and then a preset early warning mechanism is applied to the user's access authorities according to a matching degree between the usage information of the user and usage information predicted by the portrait model of the user, without learning complicated ACL settings, which is more friendly to the user.

Another one or more of the above technical solutions may have the following advantages or advantageous effects: in technical solutions of embodiments of the present disclosure, the portrait model of the user is constructed by using a machine learning method, so that the portrait model of the user can be continuously improved and evolved over time, and the detection of abnormal users becomes more and more accurate.

The above summary is provided only for illustration, and is not intended to limit the disclosure in any way. In addition to the illustrative aspects, embodiments and features described above, further aspects, embodiments and features of the present disclosure may be readily understood from the following detailed description with reference to the accompanying drawings.

BRIEF DESCRIPTION OF THE DRAWINGS

Unless otherwise specified, identical or similar parts or elements are denoted by identical reference signs throughout several figures of the accompanying drawings. The drawings are not necessarily drawn to scale. It should be understood that these drawings merely illustrate some embodiments of the present disclosure, and should not be construed as limiting the scope of the disclosure.

DETAILED DESCRIPTION

Hereinafter, only some exemplary embodiments are simply described. As can be recognized by those skilled in the art, the described embodiments may be modified in various ways without departing from the spirit or scope of the present disclosure. Accordingly, the drawings and the description should be considered as illustrative in nature instead of being restrictive.

First Embodiment

Figure 1:
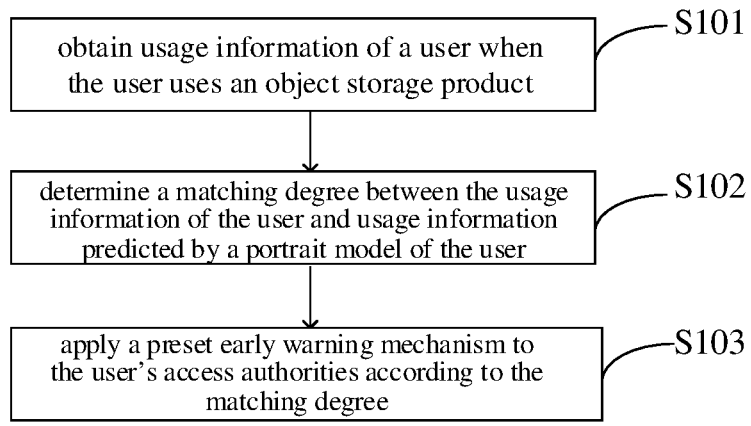
FIG. 1 is a schematic flowchart of an authority management method in a distributed environment according to a first embodiment of the present disclosure.

An authority management method in a distributed environment is provided according to an embodiment of the present disclosure. FIG. 1 is a schematic flowchart of an authority management method in a distributed environment according to an embodiment of the present disclosure. The authority management method in a distributed environment according to an embodiment of the present disclosure includes the following steps S101-S103.

At S101, usage information of a user is obtained when the user uses an object storage product.

The embodiment of the disclosure may monitor usage information of the user in real time. The usage information includes the user's behavior, status and feature. The user's behavior is the user's usage behavior, such as the user's behavior of downloading or uploading network resources, and the user's normal or abnormal access request; the user's status is, for example, the login status or offline status; the user's feature is, for example, the user's preferences and interests.

At S102, a matching degree between the usage information of the user and usage information predicted by a portrait model of the user is determined.

The user's portrait includes tags abstracted from the user's information such as social attributes, living habits, and consumer behaviors. Its roles may include the followings:

(1) accurate marketing: analysis of potential users of products; for example, marketing for specific groups using SMS, email or the like;

(2) user statistics, for example, cities ranking TOP 10 in reading, and real estate transaction conditions in the second and third tier cities;

(3) data mining by constructing an intelligent recommendation system and using association rules for calculation, for example, analysis of "what sports brands the young people usually like" using a clustering algorithm;

(4) effect evaluation to improve product operation and improve service quality, which is in fact equivalent to market research and user research to quickly locate service groups and provide high-level services;

(5) personalized customization of services or products, that is, personalized services for a certain group or even each user, which is considered to be the current development trend, and the future mainstream of consumption; for example, a company wants to launch a toy for children of 2 to 5 years old, then it is found that most of the children of this age group like the cartoon "Here Comes the Bear" though analysis of the user's portrait, therefore, a very objective and effective decision-making basis is provided for the new product; and (6) business operation analysis and competition analysis, which will affect the development strategy of the enterprise.

The embodiment of the present disclosure adopts the data mining function of the user's portrait. A portrait model of the user is constructed according to the historical usage information of the user in advance, and then it is determined whether the detected usage information of the user conforms to usage information predicted by the portrait model of the user. If not, it means that there might be abnormality in the current usage by the user. Further, if the detected usage information of the user does not conform to usage information predicted by the portrait model of the user in a certain type of behavior, it is also necessary to analyze the extent to which the detected usage information of the user does not conform to usage information predicted by the portrait model of the user, or the degree of matching with the portrait model of the user. For example, according to the prediction of the portrait model of the user, the time period in which the user uses the object storage product is ranging from 8:00 pm to 2:00 am on the weekend, while the user actually uses the object storage product on a working day, such as on Wednesday. The matching degree is calculated using a relevant algorithm according to an analysis on a probability that this abnormality occurs to the user, and thus the matching degree in this case is 99% by calculation. If the user uses the object storage product for several consecutive working days, the matching degree is reduced to 88% by calculation. If the user uses the object storage product consecutively on working days in one month, the matching degree is reduced to 59% by calculation. Of course, if the user has indeed changed the time of using the object storage product, the changed usage information of the user can be fed back to the portrait model of the user for adjustment, which will be described in the following embodiments.

At S103, a preset early warning mechanism is applied to the user's access authorities according to the matching degree.

In the embodiment of the present disclosure, different threshold ranges may be set for the matching degree between the usage information of the user and usage information predicted by the portrait model of the user, and then the corresponding preset early warning mechanisms are respectively applied to the user's access authorities within different threshold ranges. For example, when the usage information of the user does not match with usage information predicted by the portrait model of the user to a very large extent, the user's access authorities can be prohibited. For another example, when the usage information of the user does not match with the portrait model of the user only to a small extent, the user's access authorities can be restricted.

According to the technical solution of the embodiment of the present disclosure, the usage information of the user is compared with usage information predicted by the portrait model of the user, and then a preset early warning mechanism is applied to the user's access authorities according to the matching degree, without learning complicated ACL settings, which is more friendly to the user.

Second Embodiment

Figure 2:
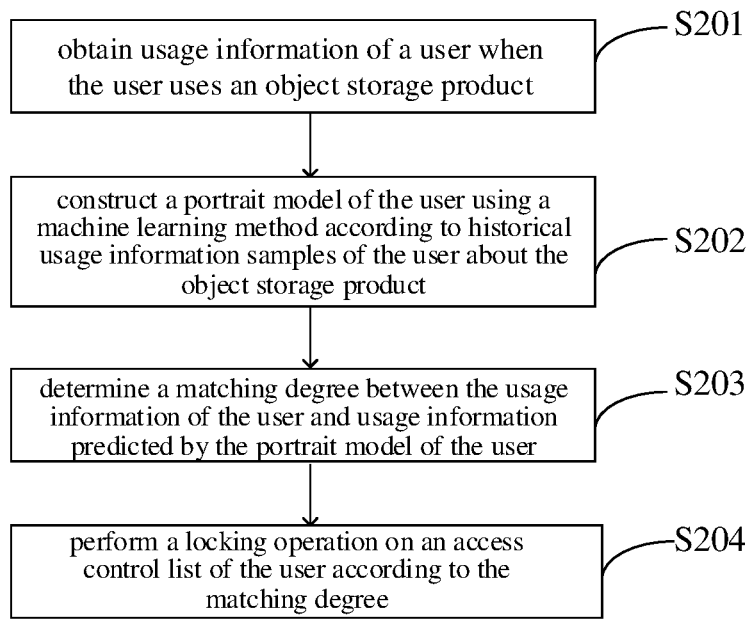
FIG. 2 is a schematic flowchart of an authority management method in a distributed environment according to a second embodiment of the present disclosure.

On the basis of the first embodiment, an authority management method in a distributed environment is provided according to an embodiment of the present disclosure. FIG. 2 is a schematic flowchart of an authority management method in a distributed environment according to an embodiment of the present disclosure. The authority management method in a distributed environment according to the embodiment of the present disclosure includes the following steps S201-S204.

At S201, usage information of a user is obtained when the user uses an object storage product, the usage information of the user including the user's behavior, status and feature.

At S202, a portrait model of the user is constructed using a machine learning method according to historical usage information samples of the user about the object storage product.

Constructing the portrait model of the user using the machine learning method may include taking the user's historical usage information as samples, classifying the samples, training by using the samples from multiple dimensions, and combining the samples of different dimensions, so as to accurately match the user to the model in different scenes.

Common samples for constructing the portrait model of the user include: (1) information on the user's login to a terminal; (2) application programming interfaces (API) used by the user to login to the terminal; and (3) distribution of the APIs used by the user, which may be counted respectively by hour, day and month; and (4) the frequencies and the rates used by various APIs, as well as the Internet Protocol (IP) between the user's location and the network.

In the specific implementation of the embodiment of the present disclosure, the user's usage information can still be fed back to the portrait model of the user, to constantly adjust the portrait model of the user, thus improving the accuracy in matching the user to the portrait model of the user.

At S203, a matching degree between the usage information of the user and usage information predicted by the portrait model of the user is determined.

At S204, a locking operation is performed on an access control list of the user according to the matching degree.

The access control list is a list of instructions for the router and switch interface to control the data packets into and out of the port. ACL is applicable to all routed protocols, such as IP protocol, Internet Packet Exchange Protocol (IPX), and AppleTalk. Therefore, communication between information points and communication between internal and external networks may be configured with ACL security strategy to control the access, so as to ensure network security. After the ACL is configured, the network traffic may be restricted, only a specified device is allowed to access the network, or a specific port is designated to forward data packets, etc. For example, the ACL may be configured to prevent devices in a LAN from accessing an external public network, or may be configured such that devices can only use FTP service.

The locking operation is classified into two types: an immediate locking operation and a restricted locking operation.

An immediate locking operation is performed on the access control list of the user when the matching degree is less than a first preset threshold, so as to lock all the access requests to the access control list.

All the access requests are recorded so as to continue processing the access requests after the locking operation is released.

For example, the first preset threshold is 60%. When the matching degree between the usage information of the user and usage information predicted by the portrait model of the user is less than 50%, the access control list of the user is immediately locked, and all the network behaviors involved in the ACL list are prohibited.

A restricted locking operation is performed on the access control list of the user when the matching degree is greater than or equal to the first preset threshold and less than a second preset threshold, so that the user can normally access the object storage product only when the user has regained the access authorities.

For example, the first preset threshold is 60%, and the second preset threshold is 80%. When the matching degree between the usage information of the user and usage information predicted by the portrait model of the user is greater than or equal to 60% and less than 80%, a restricting operation is performed on the access control list of the user so that the user can normally access the object storage product only when the user has regained the access authorities. For example, when a user requests an access, a token may be sent to the user. The token contains a list of privileges assigned to the user, and the token is valid for a certain period of time; when the token expires, the user needs to re-apply for a token, and meanwhile the network administrator is notified by means of alarm information.

When the matching degree is greater than or equal to the second preset threshold, the identity of the user is verified by a preset authentication mechanism, and the lock is released if the user has passed the identity verification.

In the embodiment of the present disclosure, during unlocking, the identity of the user is also required to be verified, for example, by sending a mobile phone short message for verification or by calling the user to confirm the unlocking. After unlocking, the user can access the network normally and are no longer restricted. However, once the usage information of the user matches with usage information predicted by the portrait model of the user only to a low extent, the access control list of the user is still possibly locked.

The first preset threshold and the second preset threshold may be set according to the types of authorities in the access control list.

In one of the embodiments of the present disclosure, before step S201, the method further includes:

A, monitoring a network traffic used by the user in a unit time; and

B, performing a locking operation on an access control list of the user according to the network traffic.

For example, if the number of objects downloaded, uploaded, or deleted by the user within a unit time exceeds a certain threshold, it indicates that there may be an abnormal operation. In this case, a locking operation is required to be performed on the user. For example, when the user deletes 1000 files within 1 minute, it may be a normal operation, but it is close to an abnormal operation, so a prompt may be provided to the user; if the user deletes 1000 to 5000 files within 1 minute, this is a substantially abnormal operation, and the access control list of the user can be restricted in this case; and if the user deletes more than 5000 files within 1 minute, the access control list of the user can be immediately locked.

In another one of the embodiments of the present disclosure, before step S201, the method further includes:

A', monitoring an object to which the user sends an access request;

B', directly blocking access to the object of the access request, if the object of the access request is in a black list; and C', skipping all the early warning mechanisms to normally access the object of the access request, if the object of the access request is in a white list.

To prevent over-limitation, misjudgment, or insufficient coverage of the scene, a black list and a white list may be set for the user. If the object of an access request is in the black list, access to the object of the access request is directly blocked, and meanwhile this event is recorded in the log; and if the object of the access request is in the white list, all the early warning mechanisms are skipped directly, that is, there is no locking operation or any other early warning operations.

Figure 3:
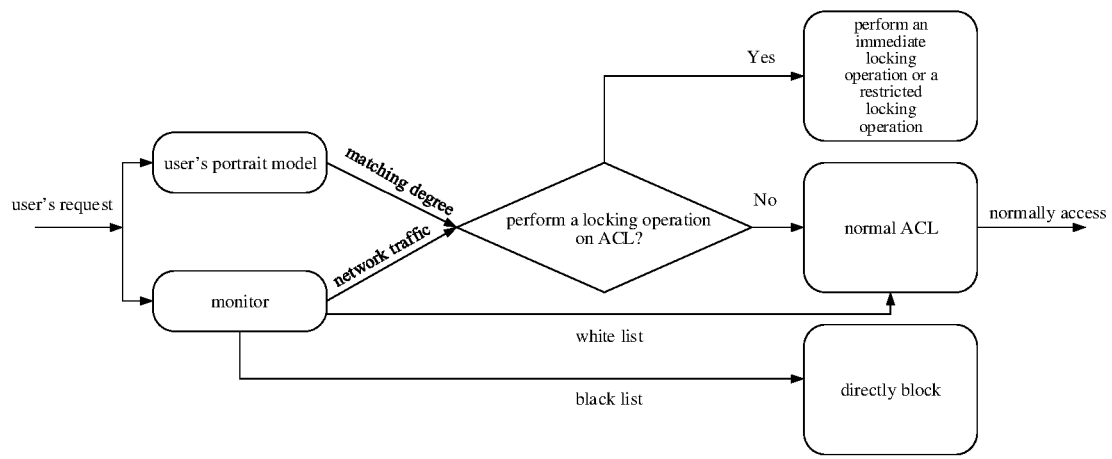
FIG. 3 is a schematic diagram showing the management process of the authority management method in a distributed environment according to a second embodiment of the present disclosure.

FIG. 3 is a schematic diagram showing the management process of the authority management method in a distributed environment according to an embodiment of the present disclosure. When the user sends an access request to the object storage product, the usage information of the user is compared with usage information predicted by the portrait model of the user to determine the matching degree between the usage information of the user and usage information predicted by the portrait model of the user, and the network traffic used by the user in a unit time is monitored, so as to determine whether a LOCK operation on ACL will be performed according to the matching degree and the monitoring result. It is also possible to monitor whether the object of the access request is in a black list or in a white list. If it is in a white list, the early warning mechanisms are skipped to continue a normal access. If it is in a black list, access to the object of the access request is directly blocked.

The user involved in the embodiments of the present disclosure refers to the terminal used by the user. Herein, merely for a convenient and vivid description and to highlight the authority management, the user is referred to in place of a terminal. The device involved in the embodiments of the present disclosure is a device for accessing the network, and also may refer to a terminal.

In the technical solution of the embodiment of the present disclosure, the portrait model of the user is constructed by using a machine learning method, so that the portrait model of the user can be continuously improved and evolved over time, and the detection of abnormal users becomes more and more accurate.

Third Embodiment

Figure 4:
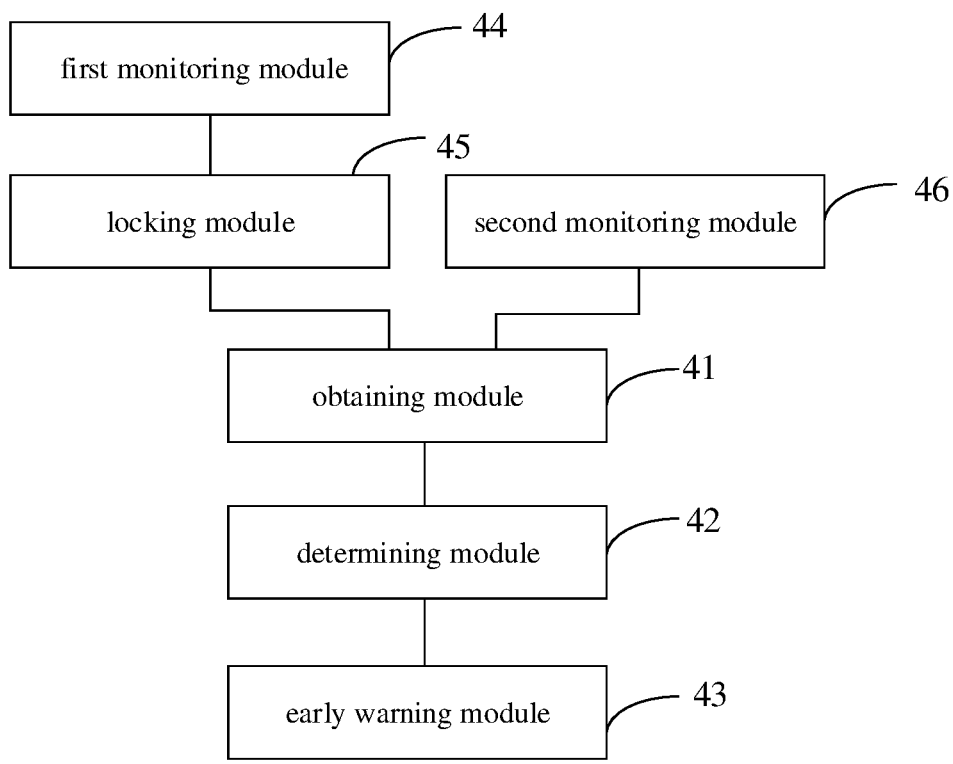
FIG. 4 is a schematic diagram of an authority management device in a distributed environment according to a third embodiment of the present disclosure.

An authority management device in a distributed environment is provided according to an embodiment of the present disclosure. FIG. 4 is a schematic diagram of an authority management device in a distributed environment according to an embodiment of the present disclosure. The authority management device in a distributed environment according to the embodiment of the present disclosure includes:

an obtaining module 41 configured to obtain usage information of a user when the user uses an object storage product, the usage information including the user's behavior, status and feature;

a determining module 42 configured to determine a matching degree between the usage information of the user and usage information predicted by a portrait model of the user; and an early warning module 43 configured to apply a preset early warning mechanism to the user's access authorities according to the matching degree.

Further, the device further includes:

a first monitoring module 44 configured to monitor a network traffic used by the user in a unit time; and a locking module 45 configured to perform a locking operation on an access control list of the user according to the network traffic.

Further, the device further includes:

a second monitoring module 46 configured to monitor an object to which the user sends an access request, wherein if the object of the access request is in a black list, access to the object of the access request is directly blocked; and if the object of the access request is in a white list, all the early warning mechanisms are skipped to normally access the object of the access request.

According to the technical solution of the embodiment of the present disclosure, the usage information of the user is compared with usage information predicted by the portrait model of the user, and then a preset early warning mechanism is applied to the user's access authorities according to the matching degree between the usage information of the user and the usage information predicted by the portrait model of the user, without learning complicated ACL settings, which is more friendly to the user. This technical effect is the same as the first embodiment, and is not repeated discussed herein.

Fourth Embodiment

Figure 5:
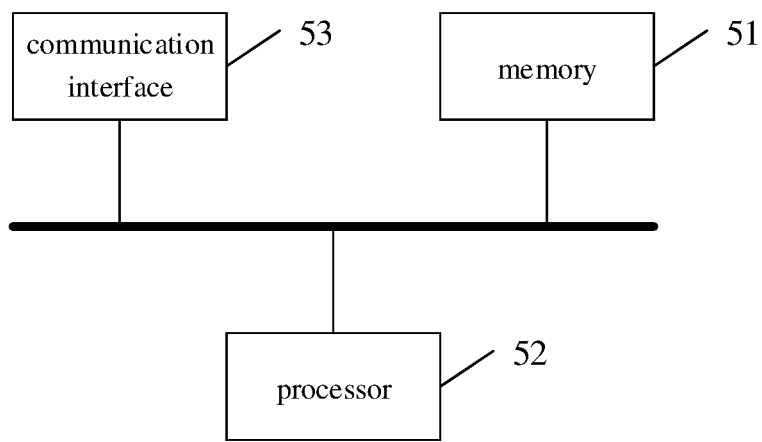
FIG. 5 is a schematic diagram of a server according to a fourth embodiment of the present disclosure.

A server is provided according to the fourth embodiment of the present disclosure. As shown in FIG. 5, the server includes a memory 51 and a processor 52, wherein a computer program that can run on the processor 52 is stored in the memory 51. When the processor 52 executes the computer program, the authority management methods in the above embodiments are implemented. The number of each of the memory 51 and the processor 52 may be one or more.

The Server Further Includes:

a communication interface 53 configured to enable the memory 51 and the processor 52 to communicate with an external device.

The memory 51 may include a high-speed RAM memory, or may also include a non-volatile memory, such as at least one disk memory.

If the memory 51, the processor 52 and the communication interface 53 are implemented independently, the memory 51, the processor 52 and the communication interface 53 may be connected to one another via a bus so as to realize mutual communication. The bus may be an industry standard architecture (ISA) bus, a peripheral component interconnect (PCI) bus, an extended industry standard architecture (EISA) bus, or the like. The bus may be categorized into an address bus, a data bus, a control bus and so on. For ease of illustration, only one bold line is shown in FIG. 5 to represent the bus, but it does not mean that there is only one bus or only one type of bus.

Optionally, in a specific implementation, if the memory 51, the processor 52 and the communication interface 53 are integrated on one chip, then the memory 51, the processor 52 and the communication interface 53 can complete mutual communication through an internal interface.

Fifth Embodiment

A computer readable storage medium is provided according to an embodiment of the present disclosure, wherein a computer program is stored therein, and the computer program, when executed by a processor, implements the method illustrated in any of the embodiments of FIGS. 1 to 3.

In the present specification, the description referring to the terms "one embodiment", "some embodiments", "an example", "a specific example", or "some examples" or the like means that the specific features, structures, materials, or characteristics described in connection with the embodiment or example are contained in at least one embodiment or example of the disclosure. Moreover, the specific features, structures, materials, or characteristics described may be combined in a suitable manner in any one or more embodiments or examples. In addition, various embodiments or examples described in the specification as well as features of different embodiments or examples may be united and combined by those skilled in the art, as long as they do not contradict with each other.

Furthermore, terms "first" and "second" are used for descriptive purposes only, and are not to be construed as indicating or implying relative importance or implicitly indicating the number of recited technical features. Thus, a feature defined with "first" and "second" may include at least one said feature, either explicitly or implicitly. In the description of the present disclosure, the meaning of "a plurality" is two or more than two, unless otherwise explicitly or specifically indicated.

Any process or method described in the flowcharts or described otherwise herein may be construed as a module, segment or portion of code representing executable instructions including one or more steps for implementing a particular logical function or process. The scope of the preferred embodiments of the present disclosure includes additional implementations in which functions may be implemented in an order that is not shown or discussed, including in a substantially concurrent manner or in a reverse order based on the functions involved. All these should be understood by those skilled in the art to which the embodiments of the present disclosure belong.

The logics and/or steps represented in the flowchart or otherwise described herein for example may be considered as an ordered list of executable instructions for implementing logical functions. They can be specifically embodied in any computer-readable medium for use by an instruction execution system, apparatus or device (e.g., a computer-based system, a system including a processor, or another system that can obtain instructions from the instruction execution system, apparatus or device and execute these instructions) or for use in conjunction with the instruction execution system, apparatus or device. For the purposes of the present specification, "computer-readable medium" can be any means that can contain, store, communicate, propagate or transmit programs for use by an instruction execution system, apparatus or device or for use in conjunction with the instruction execution system, apparatus or device.

The computer-readable medium described in the embodiments of the disclosure may a computer-readable signal medium or a computer-readable storage medium or any combination of a computer-readable signal medium and a computer-readable storage medium. More specific examples (non-exhaustive list) of computer-readable storage medium at least include: electrical connection parts (electronic devices) having one or more wires, portable computer disk cartridges (magnetic devices), random access memory (RAM), read only memory (ROM), erasable programmable read-only memory (EPROM or flash memory), fiber optic devices, and portable read only memory (CDROM). In addition, the computer-readable storage medium may even be a paper or other suitable medium on which the programs can be printed. This is because for example the paper or other medium can be optically scanned, followed by editing, interpretation or, if necessary, other suitable ways of processing so as to obtain the programs electronically, which are then stored in a computer memory.

In an embodiment of the disclosure, the computer-readable signal medium may include a data signal propagating in a baseband or as a part of a carrier, in which computer-readable program codes are carried. Such propagating data signal can take a variety of forms including, but not limited to, electromagnetic signals, optical signals, or any suitable combination of the electromagnetic signals and optical signals. The computer-readable signal medium may also be any computer-readable medium other than a computer-readable storage medium, and the computer-readable medium can send, propagate or transmit a program for use by an instruction execution system, an input method, or a device or for use in conjunction with an instruction execution system, an input method, or a device. The program codes embodied in the computer-readable medium can be transmitted by any suitable medium, including but not limited to: wireless, wire, optic cable, radio frequency (RF), etc., or any suitable combination of the foregoing.

It should be understood that individual portions of the present disclosure may be implemented in the form of hardware, software, firmware, or a combination thereof. In the above embodiments, a plurality of modules, steps or methods may be implemented using firmware or software stored in a memory and executed by a suitable instruction execution system. For example, if they are implemented in hardware, as in another embodiment, any one or a combination of the following techniques known in the art may be used: discrete logic circuits having logic gate circuits for implementing logic functions on data signals, application-specific integrated circuits having suitable combined logic gate circuits, programmable gate arrays (PGA), field programmable gate arrays (FPGA), etc.

Those skilled in the art may understand that all or some of the steps carried in the method of the foregoing embodiments may be implemented by using a program to instruct the relevant hardware, and the program may be stored in a computer-readable storage medium. When executed, the program includes one or a combination of the steps in the method embodiments.

In addition, individual functional units in various embodiments of the present disclosure may be integrated in one processing module, or individual units may also exist physically and independently, or two or more units may also be integrated in one module. The above integrated module can be implemented in the form of hardware or in the form of a software functional module. The integrated module may also be stored in a computer-readable storage medium if it is implemented in the form of a software functional module and sold or used as a stand-alone product. The storage medium may be a read-only memory, a magnetic disk or an optical disk, etc.

The above description only relates to specific embodiments of the present disclosure, but the scope of protection of the present disclosure is not limited thereto, and any of those skilled in the art can readily contemplate various changes or replacements within the technical scope of the present disclosure. All these changes or replacements should be covered by the scope of protection of the present disclosure. Therefore, the scope of protection of the present disclosure should be subject to the protection scope of the appended claims.

What is claimed is:

1. An authority management method in a distributed environment, comprising:
   obtaining usage information of a user when the user uses an object storage product, the usage information comprising the user's behavior, status and feature;
   determining a matching degree between the usage information of the user and usage information predicted by a portrait model of the user; and
   applying a preset early warning mechanism to the user's access authorities according to the matching degree, including performing a locking operation on an access control list of the user according to the matching degree.

2. The method of claim 1, wherein before said determining the matching degree between the usage information of the user and usage information predicted by a portrait model of the user, the method further comprises:
   constructing the portrait model of the user using a machine learning method according to historical usage information samples of the user about the object storage product.

3. The method of claim 1, wherein said performing the locking operation on the access control list of the user according to the matching degree comprises selectively performing locking operations classified into two types: an immediate locking operation and a restricted locking operation.

4. The method of claim 3, wherein said performing the locking operation on the access control list of the user according to the matching degree comprises:
   performing the immediate locking operation on the access control list of the user when the matching degree is less than a first preset threshold, to lock all access requests to the access control list; and
   recording all the access requests so as to continue processing the access requests after the locking operation is released.

5. The method of claim 4, wherein said performing the locking operation on the access control list of the user according to the matching degree comprises:

performing the restricted locking operation on the access control list of the user when the matching degree is greater than or equal to the first preset threshold and less than a second preset threshold, to restrict the access requests to the access control list.

6. The method of claim 5, wherein said performing the locking operation on the access control list of the user according to the matching degree comprises:

verifying the identity of the user by a preset authentication mechanism when the matching degree is greater than or equal to the second preset threshold, and releasing the locking operation in response to the user passing the identity verification.

7. The method of claim 1, wherein before said obtaining usage information of the user when the user uses an object storage product, the method further comprises:

monitoring a network traffic used by the user in a unit time; and performing a locking operation on an access control list of the user according to the network traffic.

8. The method of claim 1, wherein before said obtaining usage information of the user when the user uses an object storage product, the method further comprises:

monitoring an object to which the user sends an access request;

directly blocking access to the object of the access request in response to determining that the object of the access request is in a black list; and skipping the preset early warning mechanism to normally access the object of the access request in response to determining that the object of the access request is in a white list.

9. An authority management device in a distributed environment, comprising:

one or more processors; and a storage device configured to store one or more programs, wherein the one or more programs, when executed by the one or more processors, enable the one or more processors to:

obtain usage information of a user when the user uses an object storage product, the usage information comprising the user's behavior, status and feature;

determine a matching degree between the usage information of the user and usage information predicted by a portrait model of the user; and apply a preset early warning mechanism to the user's access authorities according to the matching degree;

monitor a network traffic used by the user in a unit time; and perform a locking operation on an access control list of the user according to the network traffic.

10. The device of claim 9, wherein the one or more programs, when executed by the one or more processors, further enable the one or more processors to:

monitor an object to which the user sends an access request, directly block access to the object of the access request in response to determining that the object of the access request is in a black list, and skip the preset early warning mechanism to normally access the object of the access request in response to determining that the object of the access request is in a white list.

11. A computer readable storage medium having a computer program stored thereon, wherein the computer program, when executed by a processor, implements the method of claim 1.

* * * * *